United States Patent
Bhogal et al.

(10) Patent No.: US 8,914,437 B2
(45) Date of Patent: Dec. 16, 2014

(54) METHOD FOR CAPTURING AND RECORDING URLS SHARED DURING CORRESPONDENCE

(75) Inventors: Kulvir Singh Bhogal, Pflugerville, TX (US); William Arthur Griffith, Austin, TX (US); Mark William Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 12/826,136

(22) Filed: Jun. 29, 2010

(65) Prior Publication Data

US 2011/0320526 A1    Dec. 29, 2011

(51) Int. Cl.
*G06F 15/16*    (2006.01)
*G06F 17/30*    (2006.01)

(52) U.S. Cl.
CPC .............................. *G06F 17/30902* (2013.01)
USPC ........... 709/203; 715/700; 709/201; 709/217; 709/219; 709/226; 709/223

(58) Field of Classification Search
CPC ................................................ G06F 17/30902
USPC ............................................................. 709/203
See application file for complete search history.

(56) References Cited

U.S. PATENT DOCUMENTS

| | | | |
|---|---|---|---|
| 2003/0014489 A1 | 1/2003 | Inala et al. | |
| 2003/0182401 A1* | 9/2003 | Moriya | 709/219 |
| 2005/0262052 A1 | 11/2005 | Daniels et al. | |
| 2006/0047661 A1* | 3/2006 | Chowdhury et al. | 707/10 |
| 2008/0005342 A1* | 1/2008 | Schneider | 709/230 |
| 2008/0215678 A1 | 9/2008 | Coletrane et al. | |
| 2009/0172712 A1 | 7/2009 | Rothman et al. | |
| 2009/0241032 A1 | 9/2009 | Challener et al. | |
| 2009/0254529 A1* | 10/2009 | Goldentouch | 707/3 |
| 2011/0022571 A1* | 1/2011 | Snyder | 707/692 |

* cited by examiner

*Primary Examiner* — Jude Jean Gilles
*Assistant Examiner* — Jaren M Means
(74) *Attorney, Agent, or Firm* — Holland & Knight LLP; Brian J. Colandreo, Esq.; Jeffrey T. Placker, Esq.

(57) ABSTRACT

Systems and methods of managing URLs including capturing and recording URLs are presented. A digital processor detects a URL in a communication communicated between a sending-user and a receiving-user. The detected URL is automatically stored in a cache memory specific to the sending-user or receiving-user. The cache memory allows bookmarking of URLs to be avoided and centrally stores the URLs in browser history of the respective user improving his searching efficiency. The cache memory serves as a pre-bookmark incubator or filter.

20 Claims, 5 Drawing Sheets

METHOD FOR CAPTURING AND RECORDING URLS SHARED DURING CORRESPONDENCE

BACKGROUND

Computer users often share URLs (uniform resource locators) with one another through mediums such as instant messaging, email notes, and even shared documents. Yet today, these URLs are kept in the history of the respective individual application such that a user must open each collaborative application and search the history in order to recall shared URLs.

Web browsers provide a bookmarking feature that is capable of storing and later recalling saved URLs. Yet today, the web browser does not have access to the above described URLs that have been shared among users.

BRIEF SUMMARY

The present invention addresses the above problems and shortcomings in the prior art. In particular the present invention, provides systems and methods whereby shared URLs get aggregated into a centralized browser history location such that the user can simply navigate to shared URLs by navigating the web browser history functionality in lieu of searching the respective history of each individual application.

Embodiments of the present invention detect when a URL has been shared between two or more users and on the detection of said event, send this URL to a user-specific cache memory. The cache is preferably in the web browsers history file and stores the URLs in the format as required by the web browser.

In a URL management system and method embodying the present invention, a digital processor detects a URL (uniform resource locator) in a communication or message communicated between a sending-user and a receiving-user, each user using a respective client device. A processor member automatically stores a copy of the detected URL in respective cache memory specific (or personal) to the sending-user and/or the receiving-user. That is, the invention system captures and records the URL text and its metadata without user interaction (to select the URL) or user command (to store the URL). The cache memory is structured and configured to enable search and retrieval of pertinent stored URLs in response to user activity on the client device by the respective user. In particular, the cache memory and invention system make browser history searching more efficient.

In some embodiments, the cache memory is local to the client device of the respective user. In other embodiments, the cache memory is at a network server or cloud computing server that is accessible by the client device of the respective user.

The stored metadata may include any of:

indication of sending user (e.g., user name, name of organization associated with, IP address of user's client device, etc);

indication of receiving user (e.g., user name, name of organization associated with, IP address of user's client device, etc);

date and time of the communication;

a topical category or subject matter category of the URL;

and indication of application program supporting the communication. The application program may be any of chat type programs, gaming programs, email applications, messaging applications (text messaging/SMS, instant messaging, etc), online meeting applications and other collaboration applications.

Embodiments detect across multiple types of communication producing sources (source applications).

The automatic storing in cache memory avoids bookmarking the detected URLs and centralizes these URLs in browser history. Accordingly embodiments of the present invention provide a pre-bookmark incubator or pre-bookmark URL filter. In some embodiments of the invention system, a bookmark recommendation engine tracks the number of times a stored URL is touched or used, and upon a threshold number of times of touch or use, the system suggests to the user to manually accept as/create a respective bookmark.

For each detected URL, the cache memory stores the copy or text of the URL and respective metadata in a delimited, structured data fashion. Common data structures are employed. The structure employed should enable at least sorting of URL data and grouping of URL data in the cache memory. In one embodiment, the cache memory enabling searching and retrieving of pertinent stored URLs supports an autofill or autocomplete function during user activity on the client device. For instance, when a user is keying in character strings in a collaborative application running on the user's client device, the cache memory supports an auto-fill or auto-complete function by supplying pertinent URLs, i.e., matching URL text searched and retrieved from the cache memory based on initial (at that time) keyed in characters.

Embodiments provide a user interface to the cache memory. The user interface enables the respective user to set preferences including:

which types of detected URLs to capture and record (e.g., based on trusted source or domain name, etc);

length (period) of time to store each detected URL or refresh frequency; and/or whether to separate detected URLs based on the user being a sending-user of the URL or a receiving-user of the URL.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
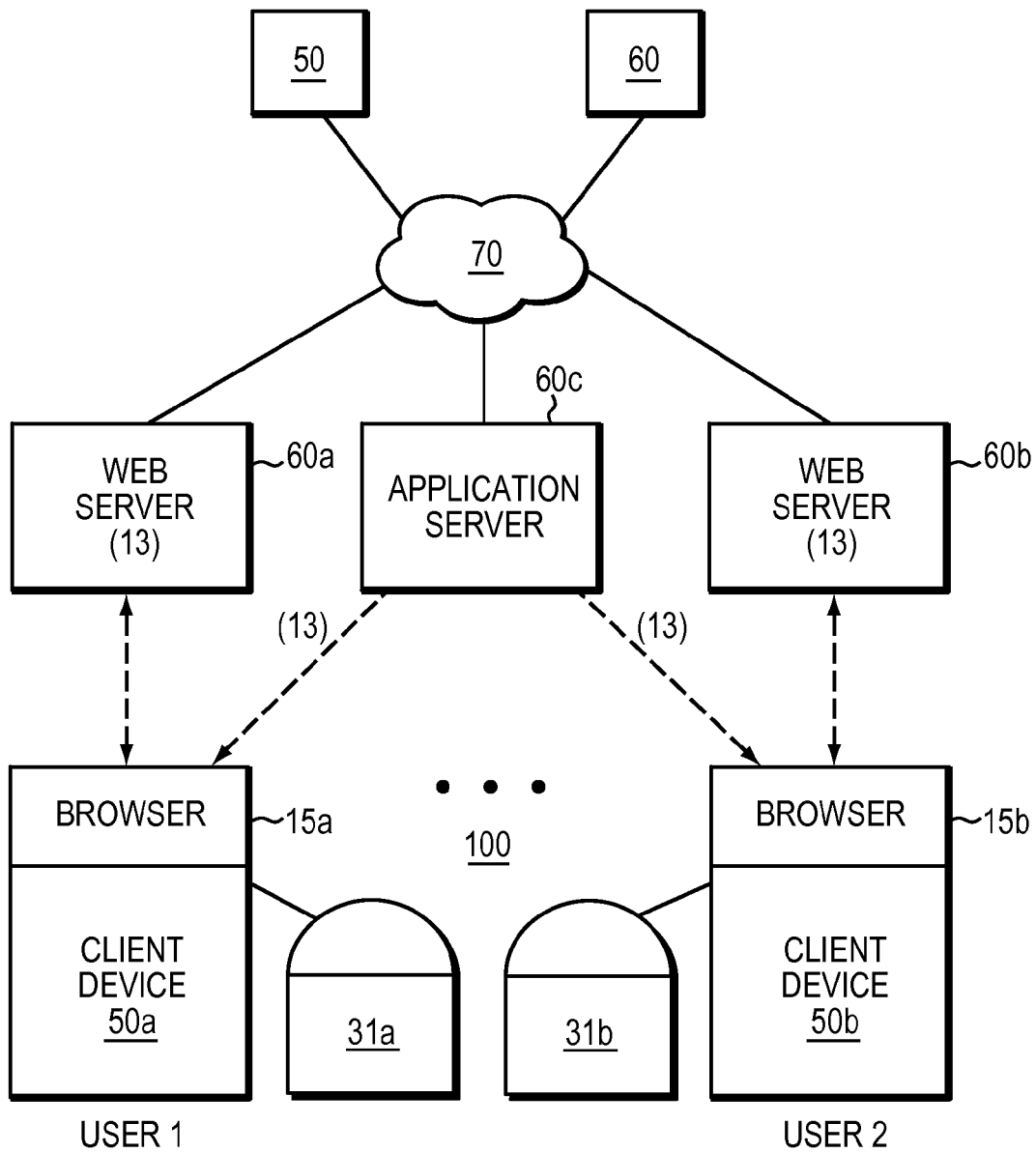
FIG. 1 is a schematic view of an embodiment of the present invention.

With reference now to FIG. 1, a computer network in which embodiments of the present invention are deployed is shown. Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

For non-limiting illustrative purposes, two users utilizing respective client devices 50a, b (generally 50) communicating through network 70 are shown. Each user client device 50a, b employs a respective browser 15a, b (generally 15) to communicate to network servers 60, such as web server 60a, b and application server 60c. Web servers 60a, b and application server 60c support email applications, chat type programs, gaming application programs, messaging applications (e.g., instant messaging, SMS or text messaging), online meeting applications and other collaboration applications (all generally 13) through which users (in this example User1 and User2) communicate to each other.

For example, User1 shares a URL (universal resource locator) 19 with User2 by sending a communication having the URL in the contents to User2. The communication may be an instant message 21 such as in the instant messaging session illustrated in FIG. 2a. The communication may be an email message as illustrated at 25 in FIG. 2b, where the instant messaging and the email message are supported by respective collaborative applications 13. The communication may be of any number of such communication producing sources/applications 13 or collaborative environments of computer users.

Using known technology, the supporting collaborative application 13 detects existence of the subject URL 19 in the communication 21, 25 and places the URL 19 in the format required by the web browser 15. Typically this browser-ready formatting is indicated by the blue font coloring and underlining of the URL 19. In particular with respect to the present invention, the supporting collaborative application 13 detects at the receiving user (User2) client 50b the shared/communicated URL 19 and renders the URL in the browser-ready format. The supporting collaborative application 13 detects at the sending user (User1) client 50a the subject URL 19 in a communication being composed and renders the URL in the browser-ready format. In addition to the browser formatting, the supporting collaborative application 13 broadcasts a "URL detected" event. Embodiments of the invention are responsive to this URL detected event.

In one embodiment, the invention URL management method and system 100 utilizes the APIs (application program interface) provided by the collaborative applications 13 to enable receipt of the URL detected events. Upon receipt of a URL detected event during the sending user (User1) composing the communication, system 100 copies (or otherwise writes) the URL 19 text into cache memory 31a specific to or personal to the sending user User1. Upon receipt of a URL detected event during the receiving user (User2) reading the communication as received from User1, system 100 copies (or otherwise writes) the URL 19 text into cache memory 31b specific to or personal to the receiving user User2. In each instance, the respective cache memory 31 is located at a local browser 15 history file address for example (local to the respective user client 50a, b). Other locations for the cache memory 31 such as a network server 60, cloud computing area or the like are suitable as long as the local browser 15 of the respective user has access to the cache memory 31.

In this way, system 100 captures and stores only URLs explicitly shared by an individual user (the certain sending user and the certain receiving user). The URL's captured and stored by system 100 are not dependent on executed usage in a browser, by a group of users or an individual user. The system 100 captured and stored URLs are of specific importance to the individual user (as opposed to a group of users) and are thus stored in the respective user's cache memory 31. System 100 treats and handles each cache memory 31 as personal or specific to the respective user as will be made clearer below.

In addition to the URL 19 text, invention system 100 stores corresponding URL metadata in the cache memory 31. This metadata may include:
  indication of the sending user;
  indication of the receiving user;
  date and time of sending/receiving the communication;
  a topical or subject matter category of the URL; and/or
  indication of application program/collaborative application 13 supporting the communication.
The indications of the sending user and/or receiving user may include user name, name of organization that the user is associated with, an IP address of the user's client device 50, and the like.

For each of the subject URLs 19, the cache memory 31 stores the copy of the URL text and respective metadata in a delimited, structured data fashion that enables typical operations of sort, group, sum, count and so forth known in the art. For non-limiting example, the cache memory 31 may be organized as a relational database or XML file. The cache 31 thus enables system 100 to search and retrieve URLs in response to subsequent user activity through client device 50. For instance, when a user is keying in character strings in a collaborative application 13 running on device 50, the cache memory 31 supports an auto-fill or auto-complete function by supplying pertinent URLs, i.e., matching URL text searched and retrieved from the cache memory 31 based on initial (at that time) keyed in characters. Various database query and equivalent techniques are suitable.

Figure 2A:
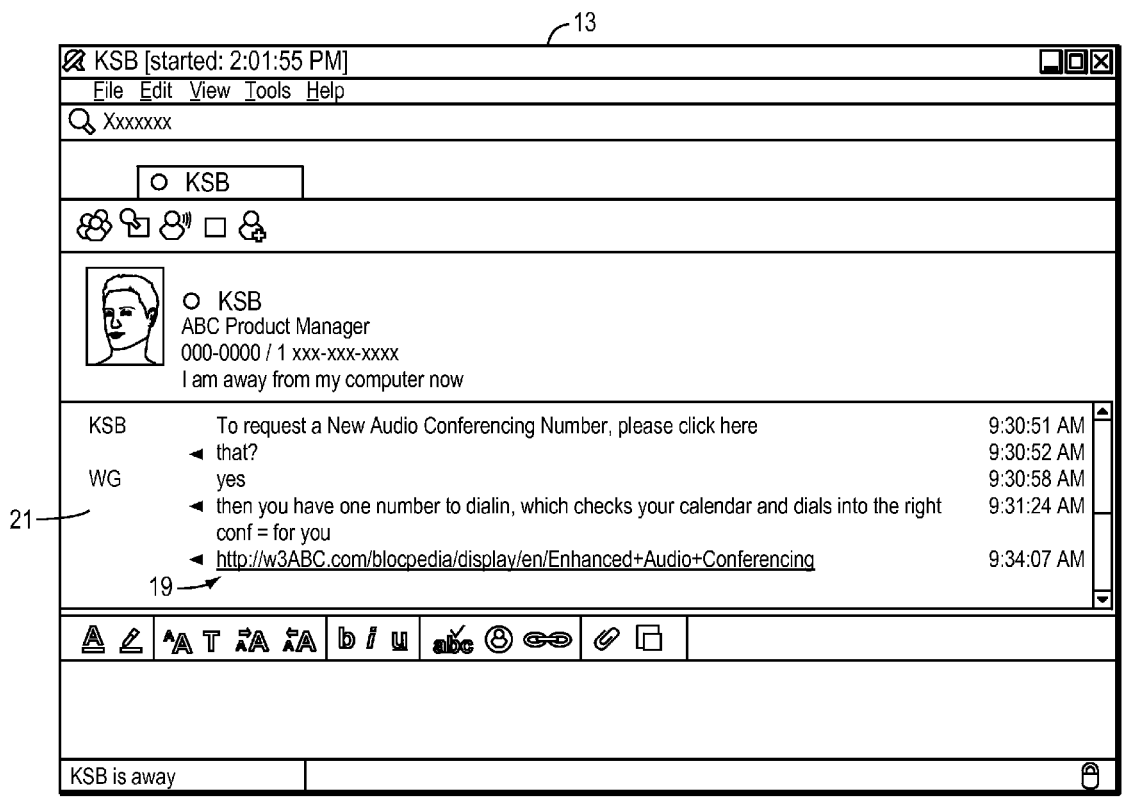
FIGS. 2a and 2b are schematic illustrations of example communications and corresponding supporting collaborative applications from which embodiments capture and record URLs.
Figure 2B:
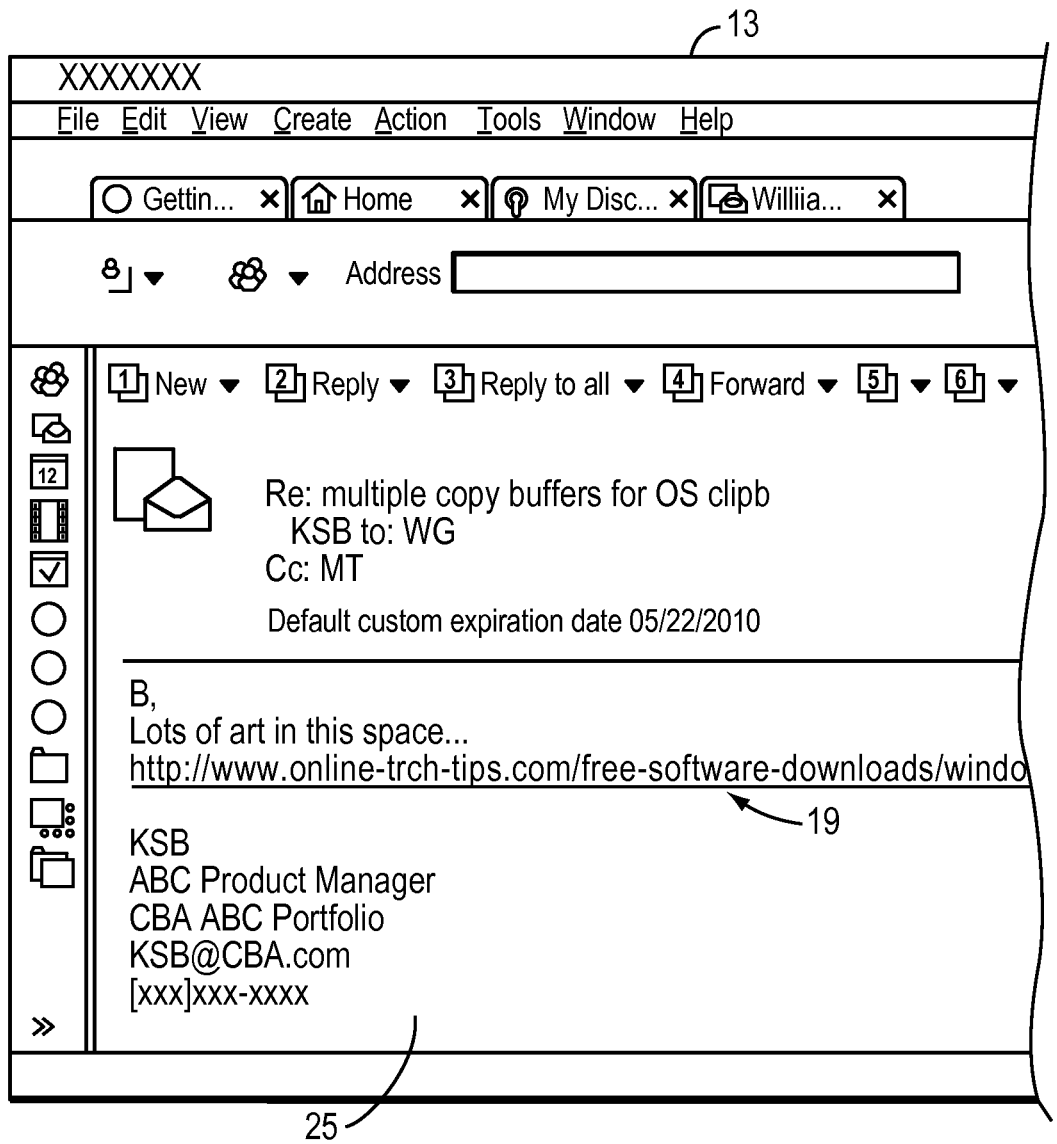

System 100 provides a browser user interface to the cache memory 31 similar to the My Favorites interface or equivalent browser interface common in the art illustrated in FIGS. 2a and 2b. In one embodiment, the user interface to cache memory 31 is an augmented Favorites having a URL History tab or menu item. The user interface also enables the respective user to set preferences or rules for maintaining the URL cache 31 including one or more of:
  which types of detected URLs to capture and store in cache 31 (based on domain name or trusted source factor),
  length of time to store each detected URL in cache 31 (e.g., a purge rate or refresh frequency), and
  whether to separate detected URLs based on the respective user being a sending user of the URL or a receiving user of the URL.
Other user-settable/adjustable preferences and parameters of cache memory 31 are suitable. Common techniques in the art are employed to accomplish user-preference setting and implementation of those set values/parameters.

Accordingly the present invention avoids book-marking of URLs 19 and provides an advantageous alternative. Restated the present invention provides a pre-bookmark incubator or filter and centralizes URLs 19 into a browser history. Embodiments of the invention include URL management systems and methods and computer methods/systems of capturing and recording URLs. Other embodiments may be features of an operating system, collaborative portals, Smart Phones, Instant Messaging clients, browsers and other computer based products or services.

Figure 3:
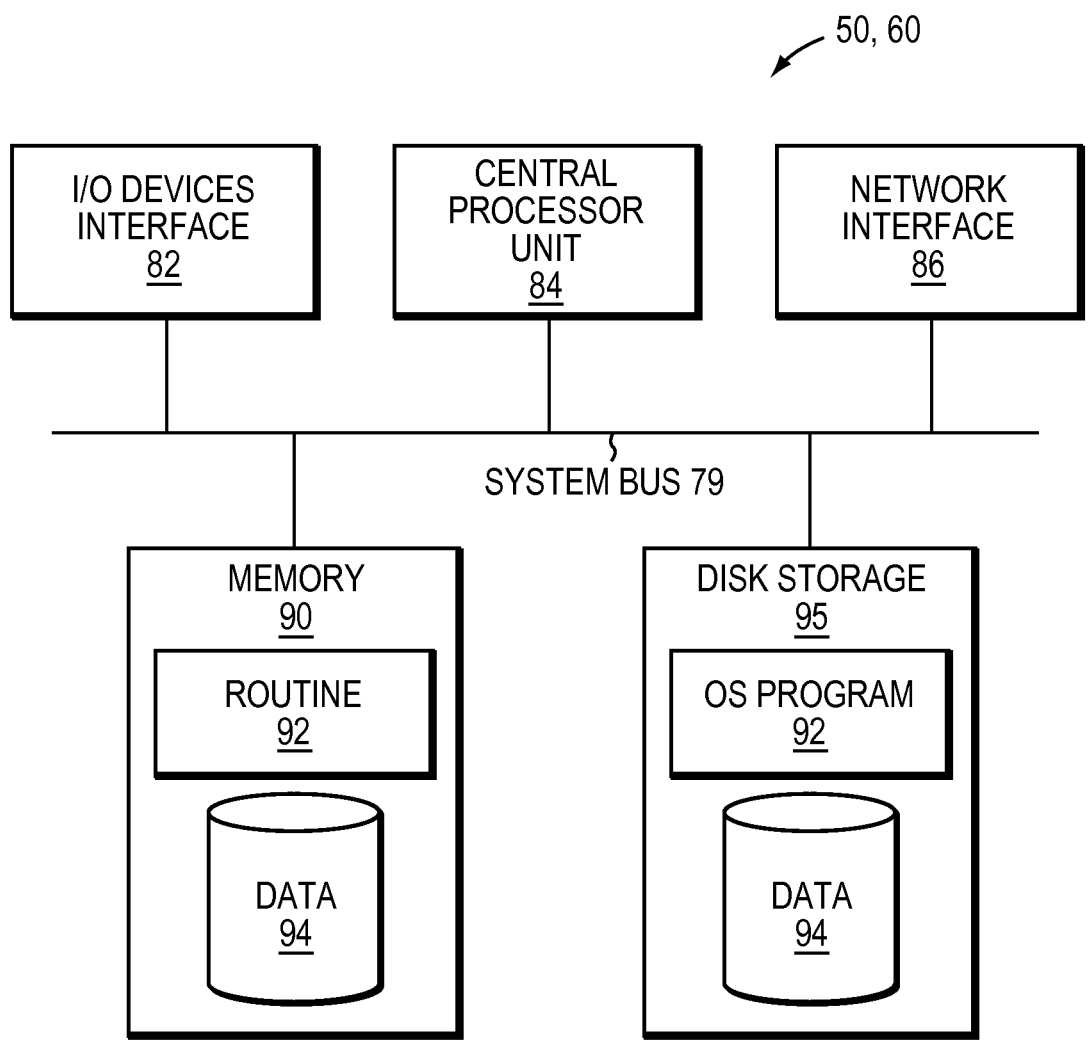
FIG. 3 is a block diagram of a computer device in the FIG. 1 embodiment.

FIG. 3 is a diagram of the internal structure of a computer (e.g., client processor/device 50 or server computers 60) in the computer network of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., communications network 70 of FIG. 1). Memory 90 provides volatile storage for computer software instructions 92 and data 94 used to implement an embodiment of the present invention (e.g., URL management method/system 100, URL capturing and recording process discussed above and further detailed below). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
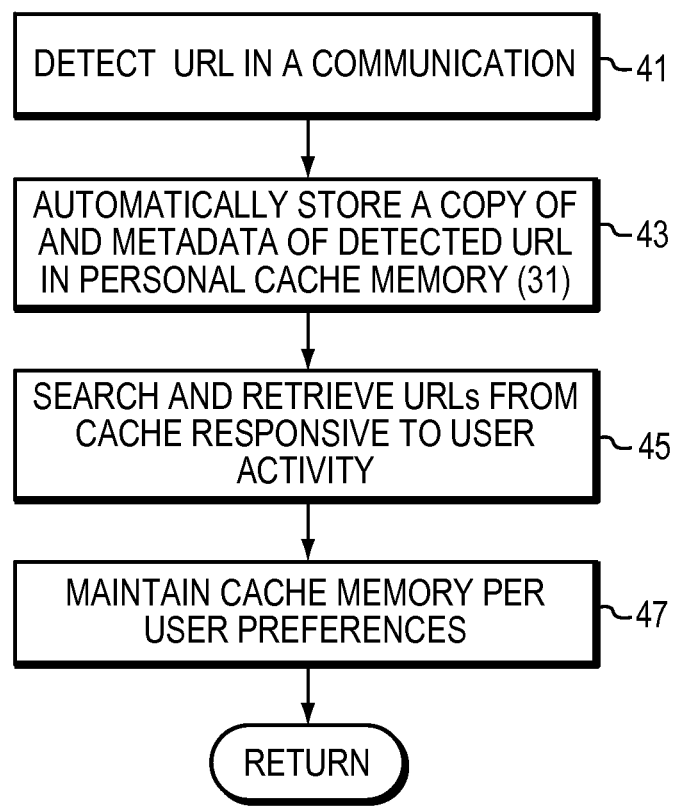
FIG. 4 is a flow diagram of an embodiment of the invention.

Referring now to FIG. 4, a flow diagram of one embodiment of invention system/method 100 is presented. The process begins with a detection member 41 detecting a URL 19 in a communication communicated between a sending-user and a receiving-user using respective client devices 50. Where the URL 19 is being explicitly shared by the sending-user, detection member 41 determines that the URL is of specific importance to the sending-user. Similarly, detection member 41 determines that the URL is of specific importance to the receiving-user. In turn, step 43 automatically (without user command or manual operation) stores a copy of and metadata of the detected URL 19 in respective personal cache memory 31. Step 43 takes into account the respective user-defined preferences of which URLs to capture and record in cache 31.

Process/system 100 at step 45 responds to subsequent user activity on client device 50. In particular, step 45 searches and retrieves pertinent URLs from cache memory 31 specific to the user as previously described. Further step 45 enables the respective user to view a listing of URLs stored in cache memory 31. This is accomplished by step 45 supporting the URL History interface or similar user interface as discussed above.

In other embodiments, step 45 may track number of times a user touches on a particular stored URL in his cache memory 31. At a threshold number of times, step 45 may suggest to the user to initiate bookmarking of this URL where it appears that it is fairly popular with the user. In this sense, the cache memory 31 and hence present invention system 100 serves as a pre-bookmark incubator.

Step 47 maintains cache memory 31 of a user per user-defined preferences, such as purges oldest of URL entries at a frequency and time threshold previously defined by the user. Step 47 also enables a user to adjust preference settings and the like using known technology.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of managing URLs comprising:
   using a digital processor, detecting existence of a URL (uniform resource locator) in contents of a communication communicated between a sending-user and a receiving-user, such that detecting detects when the URL has been explicitly shared between two or more users;
   automatically storing a copy of the detected URL, without associated content referenced by the URL, in a personal cache memory specific to a certain user without selecting the URL, the certain user being one of the sending-user and receiving-user, the storing including storing metadata of the detected URL and wherein the personal cache memory is in a web browser history file; and
   enabling search and retrieval of URLs from the personal cache memory in response to user activity by the certain user through a client device.

2. A method as claimed in claim 1 wherein the personal cache memory is local to the client device of the certain user.

3. A method as claimed in claim 1 wherein the personal cache memory is at a network server or cloud computing server accessible by the client device of the certain user.

4. A method as claimed in claim 1 wherein the stored metadata includes any of:
    indication of sending user;
    indication of receiving user;
    date and time of the communication;
    a topical category of the URL; and
    indication of application program supporting the communication.

5. A method as claimed in claim 4 wherein the indication of sending user or indication of receiving user includes any of:
    user name, name of organization user is associated with, and IP address of user's client device.

6. A method as claimed in claim 4 wherein the application program is any of:
    chat type programs, gaming programs, email applications, messaging applications, online meeting applications and collaboration applications.

7. A method as claimed in claim 1 wherein detecting detects across multiple types of communication producing sources.

8. A method as claimed in claim 1 wherein the automatic storing in personal cache memory avoids bookmarking the URL.

9. A method as claimed in claim 1 wherein for each detected URL, the personal cache memory stores the copy of the URL and respective metadata in a delimited, structured data fashion enabling at least sorting of URL data and grouping of URL data.

10. A method as claimed in claim 1 wherein enabling search and retrieval of URLs from the personal cache memory includes supporting an autocomplete or autofill function during user activity on the client device.

11. A method as claimed in claim 1 further comprising providing a user interface to the personal cache memory, the user interface enabling the certain user to set preferences including any of:
    which types of detected URLs to store, period of time to store each detected URL, and whether to separate detected URLs based on the certain user being a sending user of the URL or a receiving user of the URL.

12. A computer system capturing and recording URLs comprising:
    a detection member detecting existence of a URL (uniform resource locator) in contents of a communication communicated between a sending-user and a receiving-user, the detection member detecting that the URL has been explicitly shared between the users;
    a processor coupled in operative communication with the detection member and configured to automatically store a copy of the detected URL, without associated content referenced by the URL, in a cache memory specific to a certain user without selecting the URL, the certain user being one of the sending-user and receiving-user, the storing including storing metadata of the detected URL, the cache memory being specific to the certain user such that the cache memory is personal to the certain user; and
    wherein the cache memory is in a web browser history file and enables search and retrieval of URLs stored therein in response to user activity by the certain user through a client device.

13. The computer system of claim 12 wherein the cache memory is local to the client device of the certain user.

14. The computer system as claimed in claim 12 wherein the cache memory is at a network server or cloud computing server accessible by the client device of the certain user.

15. The computer system as claimed in claim 12 wherein the stored metadata includes any of:
    indication of sending user;
    indication of receiving user;
    date and time of the communication;
    a topical category of the URL; and
    indication of application program supporting the communication; and
    wherein the indication of sending user or indication of receiving user includes any of:
        user name, name of organization user is associated with, and IP address of user's client device.

16. A system as claimed in claim 15 wherein the application program is any of:
    chat type programs, gaming programs, email applications, messaging applications, online meeting applications and collaboration applications.

17. A system as claimed in claim 12 wherein the detection member detects across multiple types of communication producing sources.

18. A system as claimed in claim 12 wherein the automatic storing in cache memory avoids bookmarking the URL.

19. A system as claimed in claim 12 wherein the cache memory enabling search and retrieval of URLs stored therein further supports an autocomplete or autofill function during user activity on the client device.

20. A computer program product for capturing and storing URLs comprising:
    a non-transitory computer readable storage medium having computer readable program code embodied therewith, the computer readable program code configured to:
    detect a URL (uniform resource locator) in a communication communicated between a sending-user and a receiving-user, such that detecting detects when the URL has been explicitly shared between the users;
    automatically store a copy of the detected URL, without associated content referenced by the URL, in a personal cache memory specific to a certain user without selecting the URL, the certain user being one of the sending-user and receiving-user, the storing including storing metadata of the detected URL; and
    enable search and retrieval of URLs from the personal cache memory in response to user activity by the certain user through a client device wherein the personal cache memory is in a web browser history file.

* * * * *